(12) United States Patent
Giordano et al.

(10) Patent No.: US 9,274,573 B2
(45) Date of Patent: Mar. 1, 2016

(54) METHOD AND APPARATUS FOR HARDWARE RESET PROTECTION

(75) Inventors: Philip P. Giordano, Bellingham, MA (US); Scott D. Biederwolf, Austin, TX (US)

(73) Assignee: ANALOG DEVICES, INC., Norwood, MA (US)

(*) Notice: Subject to any disclaimer, the term of this patent is extended or adjusted under 35 U.S.C. 154(b) by 1214 days.

(21) Appl. No.: 12/365,386

(22) Filed: Feb. 4, 2009

(65) Prior Publication Data

US 2009/0205050 A1  Aug. 13, 2009

Related U.S. Application Data

(60) Provisional application No. 61/063,924, filed on Feb. 7, 2008.

(51) Int. Cl.
| | |
|---|---|
| G06F 1/00 | (2006.01) |
| G06F 1/24 | (2006.01) |
| G06F 21/62 | (2013.01) |
| G06F 21/71 | (2013.01) |

(52) U.S. Cl.
CPC ........ *G06F 1/24* (2013.01); *G06F 21/62* (2013.01); *G06F 21/71* (2013.01); *G06F 2221/2143* (2013.01)

(58) Field of Classification Search
USPC ............................................. 705/50; 726/26
See application file for complete search history.

(56) References Cited

U.S. PATENT DOCUMENTS

| | | | |
|---|---|---|---|
| 6,754,815 B1 | 6/2004 | Ellison et al. | |
| 7,134,123 B1 | 11/2006 | Berry et al. | |
| 7,191,464 B2 * | 3/2007 | Cromer et al. | 726/2 |
| 7,205,883 B2 * | 4/2007 | Bailey | 340/5.3 |

(Continued)

FOREIGN PATENT DOCUMENTS

| | | |
|---|---|---|
| CN | 1659497 A | 8/2005 |
| CN | 1846195 A | 10/2006 |

(Continued)

OTHER PUBLICATIONS

International Search Report for PCT Application No. PCT/US2009/000769, mailed Jul. 23, 2009, 4 pages.
Written Opinion for PCT Application No. PCT/US2009/000769, mailed Jul. 23, 2009, 5 pages.

(Continued)

*Primary Examiner* — John Hayes
*Assistant Examiner* — John M Winter
(74) *Attorney, Agent, or Firm* — Patent Capital Group

(57) ABSTRACT

A method and apparatus for protecting access to sensitive information stored in vulnerable storage areas (e.g., public memory, registers, cache) of a microprocessor. A microprocessor having a reset port to receive external reset commands may have a reset diversion circuit that may be selectively enabled. The microprocessor may operate in an open mode or a secure mode, indicating the absence or the potential presence, respectively, of sensitive information in the vulnerable storage areas. In open mode, the reset diversion circuit may be disabled such that external reset requests triggers a hardware reset. In secure mode, sensitive information may be recorded on vulnerable storage areas. The reset diversion circuit may be enabled to divert external reset requests to an interrupt which may trigger execution of a software code. The software code, when executed, may perform a secured system clean-up routine to erase the vulnerable storage areas prior to reset.

23 Claims, 8 Drawing Sheets

(56) References Cited

U.S. PATENT DOCUMENTS

| | | | |
|---|---|---|---|
| 7,302,698 B1* | 11/2007 | Proudler et al. | 726/2 |
| 7,313,705 B2* | 12/2007 | Turkboylari | 713/193 |
| 8,051,467 B2* | 11/2011 | Renno | 726/4 |
| 8,332,653 B2* | 12/2012 | Buer | 713/189 |
| 2003/0196100 A1 | 10/2003 | Grawrock et al. | |
| 2006/0090084 A1* | 4/2006 | Buer | 713/189 |
| 2007/0061633 A1 | 3/2007 | Fischer | |
| 2009/0055637 A1* | 2/2009 | Holm et al. | 713/1 |
| 2009/0249014 A1* | 10/2009 | Obereiner et al. | 711/164 |
| 2009/0260088 A1* | 10/2009 | Quach | 726/26 |

FOREIGN PATENT DOCUMENTS

| | | |
|---|---|---|
| EP | 0806723 A2 | 11/1997 |
| GB | 2432928 A | 6/2007 |
| WO | WO-03090051 A2 | 10/2003 |
| WO | WO-2005/026954 A1 | 3/2005 |
| WO | WO-2005026954 A1 | 3/2005 |

OTHER PUBLICATIONS

Office Action in Chinese Patent Application No. 200980109602.8, Feb. 23, 2012, 6 pages (translation).

* cited by examiner

METHOD AND APPARATUS FOR HARDWARE RESET PROTECTION

CROSS-REFERENCE TO RELATED APPLICATION

The present application claims the benefit, under 35 U.S.C. 119(e), of U.S. Provisional Application Ser. No. 61/063,924, filed Feb. 7, 2008, entitled "External Hardware Reset Diversion to Software Interrupt for Privacy Protection of RAM Contents," which application is hereby incorporated herein by reference in its entirety.

BACKGROUND

1. Field of the Invention

The invention relates generally to the field of computer security.

2. Description of Related Art

Reset is a mechanism used in computing to bring a computing device to an initial state or normal condition in a controlled manner. This may be desirable for a number of reasons. For example, the state of the computing device may become unknown, the computing device may become unresponsive, or it may be an expedient way of returning a processor to a predetermined state.

As a result of a reset, system registers may be restored to a predetermined (e.g., default) condition. System clocks (e.g., local oscillators) may also be reinitialized.

Resets may be activated externally, for example, by user input or through an attached device. A computing device may, for example, have a reset pin or reset button by which an external reset may be activated.

A reset may also be initiated by an internal mechanism. The computing device may support a reset command through software. In the event of a system crash or hang, a watchdog timer may expire, triggering a reset.

SUMMARY

A microprocessor having a reset port to receive external reset commands may have a reset diversion circuit that may be selectively enabled. The microprocessor may operate in an open mode (e.g., the default state) or a secure mode. In the secure mode sensitive information may be recorded in vulnerable storage areas. When the microprocessor operates in the open mode the reset diversion circuit may be disabled such that external reset requests immediately trigger a hardware reset. When the microprocessor operate in secure mode the reset diversion circuit may be enabled to divert an external reset request to an interrupt which may trigger execution of a software code. The software code may, for example perform a secured system clean-up routine to erase the vulnerable storage areas prior to reset.

In some aspects, the invention relates to an apparatus comprising a reset port, a state machine, a memory and a reset diversion circuit. The reset port is configured to receive a reset signal. The state machine is operable in any of a plurality of modes, the plurality of modes comprising a secure mode. The memory is configured to store a secured system clean-up routine. The reset diversion circuit is enabled when the state machine is to operate in the secure mode. The reset diversion circuit is configured to initialize execution of the secured system clean-up routine when the reset signal is received on the reset port.

In another aspect, the invention relates to a method of operating a microprocessor. The method comprises receiving an external reset command; and selectively diverting the external reset command from triggering a hardware reset, to triggering execution of a secured system clean-up routine. The diverting is selected to be enabled when the microprocessor is operating in a secure mode which requires secured access to microprocessor resources, and diverting is selected to be disabled when the microprocessor is operating in an open mode.

In another aspect, the invention relates to a microprocessor comprising a reset port, a memory area, a secured system clean-up module and a reset diversion circuit. The reset port is configured to receive a reset signal. The memory area is configured to store secure information. The secured system clean-up module is configured to erase the secure information from the memory area. The reset diversion module is configured, while the microprocessor is in a secure mode which secures access to microprocessor resources, to operate in an enabled state. The reset diversion module is configured in the enable state to trigger execution of the secured system clean-up module when the reset signal is received by the reset port.

In yet another aspect, the invention relates to a method of protecting information in a processor. The method comprises acts of (a) receiving a hardware reset trigger; (b) subsequent to the act (a), activating a software interrupt; (c) subsequent to the act (b), erasing the information from a storage area of the processor; and (d) subsequent to the act (c), servicing the hardware reset trigger by performing a reset of the processor.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings.

DETAILED DESCRIPTION

External resets of a microprocessor are potentially uncontrolled events that may occur at any time during operation. Resets, in general, restore a microprocessor to a default state, for example, an open mode of operation with minimal or no security measures. This presents a security risk when sensitive, confidential, and/or proprietary information of a customer or user may be stored in areas of the microprocessor which are publically accessible in the open mode. For example, a microprocessor operating in a secure mode may protect information stored in memory on registers by denying external read requests. However, by servicing a reset, the microprocessor is returned to the open mode where such protections may not be in place. A malicious entity may gain access to the memory and registers, for example, through an emulation port (e.g., IEEE 1149.1 standard "JTAG" port). In such a scenario assets intended to be protected could be compromised. A method and apparatus are provided to prevent such a "reset attack."

A microprocessor having a reset port to receive external reset commands may have a reset diversion circuit that may be selectively enabled. In the open mode, the reset diversion circuit may be disabled such that external reset requests immediately trigger a hardware reset. In secure mode, however, when sensitive information may be recorded in vulnerable storage areas, the reset diversion circuit may be enabled to divert any external reset request to an interrupt which may trigger execution of a software code. The software code may, for example, perform a secured system clean-up routine to erase the vulnerable storage areas prior to reset.

Microprocessor

Figure 1:
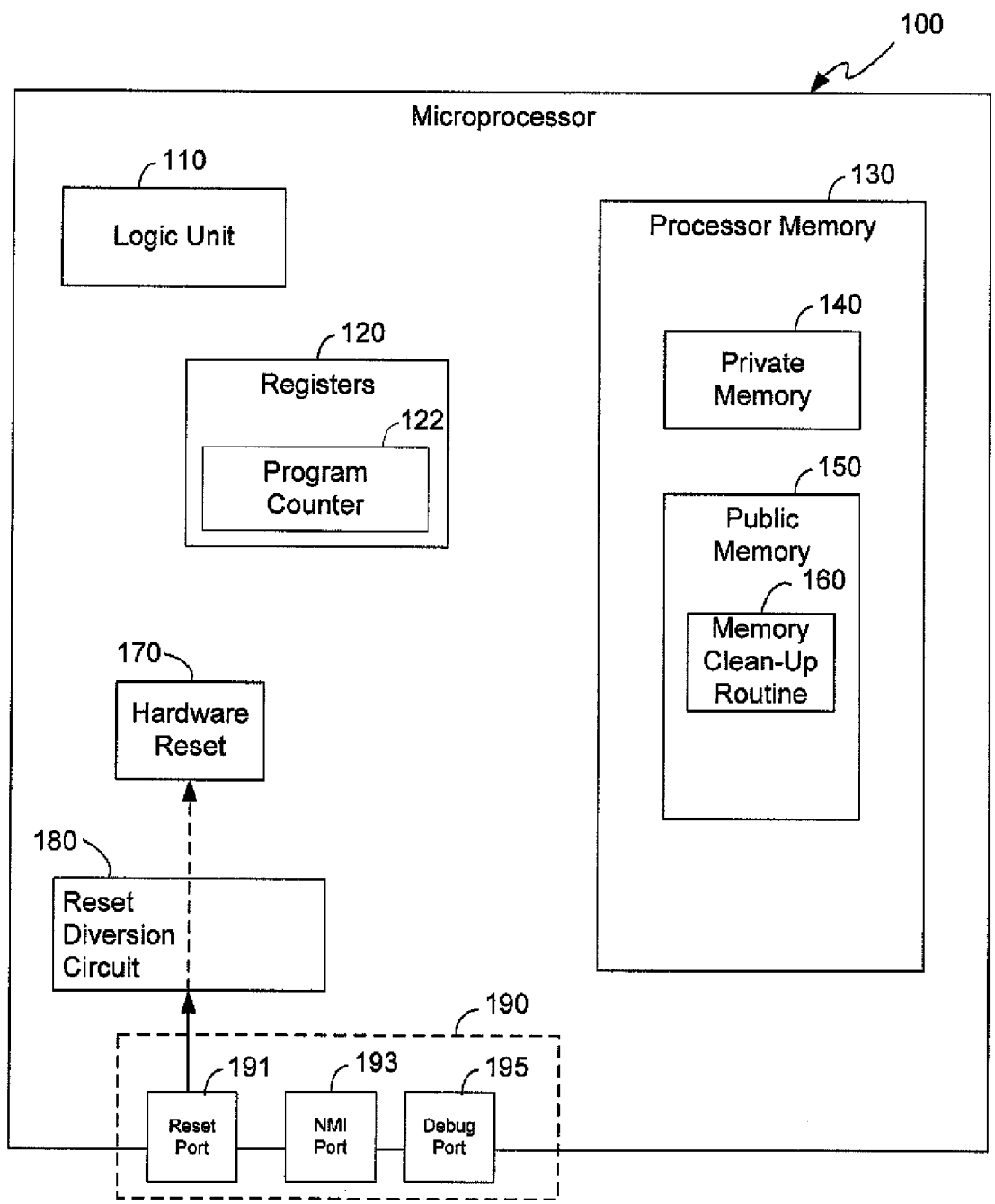
FIG. 1 is a block diagram of a microprocessor according to some embodiments.

FIG. 1 shows an embodiment of a microprocessor 100. The microprocessor 100 may have a logic unit 110, registers 120, memory 130, a hardware reset logic unit 170, a reset diversion circuit 180, and input/output (I/O) ports 190.

Logic unit 110 (e.g., central processing unit), executes instructions on microprocessor 100. Instructions executable by logic unit may originate from software (e.g., programs, code) which may consist of a series of executable instructions.

Memory 130 may be used to store executable code and/or any type of digital data. Each memory location may be associated with a memory address. Memory 130 may have one time programmable (OTP) memory, static random access memory (SRAM), read only memory (ROM), dynamic random access memory (DRAM), or any suitable memory technology or combination of memory technologies. In some embodiments, "read only" memory may be writable, but may require substantial or complete erasure prior to writing. Microprocessor 100 may prevent portions of memory 130 from being rewritten.

Memory 130 may include a private memory 140 area and a public memory 150 area. The private memory 140 may only be accessible under certain operating conditions. In some embodiments, private memory 140 is a portion of an OTP memory.

Memory 130 may have a multitude of memory cells, each adapted to store a value associated with information. Each stored value may, for example, be a bit which may take one of two binary states, represented symbolically as "0" and "1." The bits may be arranged into groups (e.g., bytes) for addressing, reading, and writing. Memory 130 may be constructed and arranged in any suitable way for storing data.

The memory 130 may store a secured system clean-up routine 160, that, when executed, deletes confidential data from areas of the microprocessor 100 that are accessible in open mode. In some embodiments, the secured system clean-up routine 160 may be stored in public memory 150, as shown in FIG. 1, however, the secured system clean-up routine 160 may be stored in any suitable memory area (e.g., private memory 140 area). The secured system clean-up routine 160 may include software instructions, executable by logic unit 110. These instructions, when executed, may erase portions of memory 130; clear portions of the registers 120; clear certain buffers, scratch memory, pointers to memory; and perform other tasks. Erasing the portion of memory 130 may remove confidential or proprietary information. Erasure may be achieved, for example, by writing to each memory cell to be erased the same value (e.g., "0"), a random value, a predetermined value, data not of a confidential or proprietary nature, purging, or any other suitable method of erasure, or any combination or repetition of methods of erasure.

In some embodiments, secured system clean-up routine 160 may reference a register, or memory location to determine which portion or portions of memory 130 or other areas of the microprocessor 100 are to be erased.

In some embodiments, secured system clean-up routine 160 is stored in ROM to prevent alteration of the software instructions.

The secured system clean-up routine 160 may perform a wipe of registers (e.g., among registers 120) used to hold data from access reads to the private memory 140. (These registers could contain secret key or other sensitive data left by user code execution).

The secured system clean-up routine may execute a watchdog RESET to reset the processor at the completion of the secured system clean-up routine.

The registers 120 may store bits of information. The bits may, for example, serve as a cache or indicate the operating state of microprocessor 100. Registers 120 may be divided into any number of individual registers, each register comprising one or more bits of information. In some embodiments, the registers 120 include a program counter (PC) 122 register that contains a memory address of an instruction to be executed by logic unit 110. In some embodiments, the program counter 122 stores an address of the current instruction for execution by logic unit 110. In some embodiments, the program counter 122 stores an address of the next instruction for execution by logic unit 110.

The microprocessor's I/O ports 190 provide input and output functionality for the transfer of information. Each port may, for example, be embodied as a pin, jack, button, switch, dial, lever, wired or wireless receiver, or any other interface technology. I/O ports 190 may include a reset port 191, a non-maskable interrupt (NMI) port 193, and a debug port 195 (e.g., in-circuit emulation (ICE) port). The reset port 191 may be used to receive an external trigger to reset microprocessor 100.

In some embodiments, NMI port 193 is provided on microprocessor 100 for externally enabling non-maskable interrupts. An interrupt may be an asynchronous signals received through hardware (e.g., through reset port 191) indicating the need for attention (handling) by microprocessor 100. An interrupt may also originate from a software event indicating the need for a change in execution by microprocessor 100.

An interrupt may be ignored (masked) if, for example, a bit in an interrupt mask register (IMR) associated with the interrupt is set. Some interrupts may be inherently non-maskable. NMI port 193 may provide an external means for enabling and/or disabling masking for one or more interrupts. Non-maskable interrupts may be prioritize for immediate execution by logic unit 110.

The reset port 191 may be used to provide an external trigger to reset microprocessor 100. Reset signals may be received on reset port 191 asynchronously.

Reset port 191 may be operably connected to hardware reset 170. A reset signal on reset port 191 may be received by hardware reset 170. Hardware reset 170 provides reset functionality for microprocessor 170. In some embodiments, hardware reset 170 is implemented as circuitry in microprocessor 100 that may be activated by the reset signal to restore microprocessor 100 to an initialized state or normal condition in a controlled manner.

In some embodiments, the reset signal on reset port 191 may be intercepted and diverted by the reset diversion circuit 180. The reset diversion circuit 180 may prevent the reset signal from triggering hardware reset 170. Reset diversion circuit 180 may divert the reset signal to a non-maskable interrupt (NMI). By diverting hardware reset to NMI while the processor operates in secure mode, servicing of hardware reset may be controlled and delayed in order to first implement a secured system clean-up routine 160. The non-maskable interrupt may trigger execution of the secured system clean-up routine 160 by logic unit 110. The reset diversion circuit 180 may be enabled and/or disabled selectively. In some embodiments, reset diversion 180 module is enabled/disabled based on one or more bits in registers 120.

In some embodiments, debug port 195 supports a "JTAG" connection to microprocessor 100. "JTAG" is an acronym for Joint Test Action Group, the committee which defined the standard more formally known as the IEEE 1149.1 entitled Standard Test Access Port and Boundary-Scan Architecture. In addition to supporting "public" JTAG instructions (e.g., boundary scan and bypass mode), or microprocessor may support "private" JTAG instructions. Private instructions, for example, may be defined by the manufacturer for a particular microprocessor. Through debug port 195 a user may send public and/or private JTAG instructions to microprocessor 100. In some embodiments, JTAG emulation may be supported. The emulation capability provides control of the processor, implementing "run", "stop", "single-step", and "examine/modify" internal registers, and real-time breakpoints.

Figure 2:
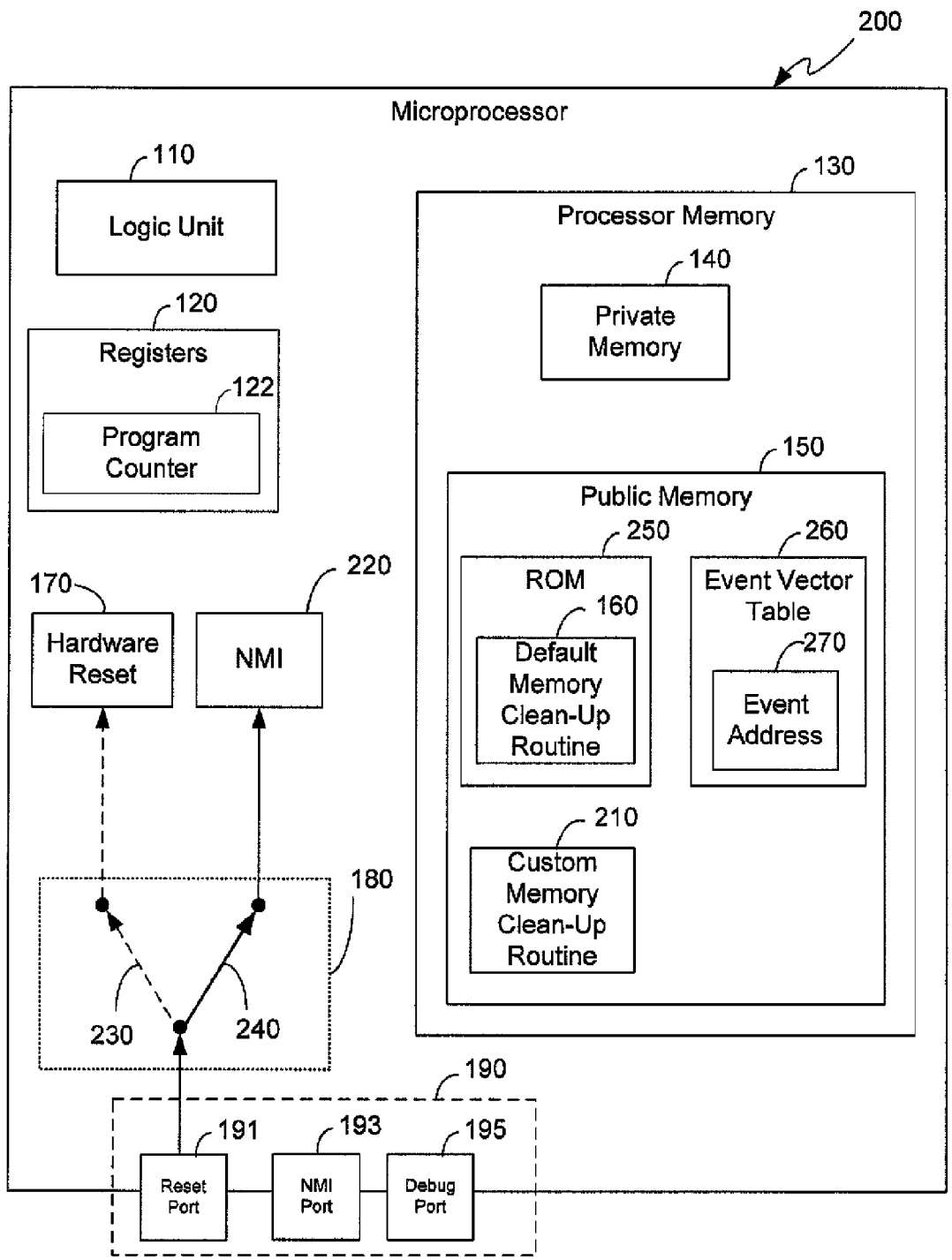
FIG. 2 is a block diagram of a microprocessor according to some embodiments.

FIG. 2 shows a block diagram of microprocessor 200. Microprocessor 200 also comprises logic unit 110, registers 120, memory 130 with private memory 140 area and public memory 150 area, hardware reset 170, reset diversion circuit 180, and I/O ports 190 as described above in reference to microprocessor 100.

Microprocessor 200 explicitly illustrates an embodiment where public memory 150 has a read only memory area 250. The "default" secured system clean-up routine 160 is stored in ROM 250. In some embodiments, a custom secured system clean-up routine 210 may be stored in public memory 150, although in some embodiments, the custom secured system clean-up routine 210 may be stored in private memory 140, or any other suitable memory location.

Reset diversion circuit 180 is operable in a disabled state 230 or an enabled state 240. In the disabled state 230, reset signals received on reset port 190 may be passed to hardware reset 170. In the enabled state 240, however, reset signals may be diverted from hardware reset 170 to Non-Maskable Interrupt (NMI) 220. NMI 220 may trigger execution of an appropriate secured system clean-up routine by microprocessor 200.

NMI 220 may first trigger a look up of an event address 270 stored in event vector table 260. Event vector table 260 may be stored in any suitable location (e.g., registers 120, memory 130, private memory 140, public memory 150 as shown). The event address 270 may have a memory address of a location of the secured system clean-up routine 160 or of a location of the custom secured system clean-up routine 210. The program counter 122 may then be updated with event address 270. Logic unit 110 may execute the corresponding secured system clean-up routine. In some embodiments, hardware reset 170 is triggered at the conclusion of the executed secured system clean-up routine. In some embodiments, the trigger is due to expiration of a watchdog timer.

Secure State Machine 300

A microprocessor may be operable in several different modes of operation to provide security and flexibility. A microprocessor may, for example, operate in an open mode of operation when security features are unneeded and access to confidential information is unnecessary. Private confidential information may be stored in private memory 140, which may be inaccessible in open mode.

When confidential information is to be processed or accessed the microprocessor may enter a secure mode of operation. In secure mode, private memory 140 may be accessible and private information may be written to registers 120 and/or memory 130.

Access to secure mode may be limited to authorized users. Code to be executed in secure mode may be authenticated prior to execution to insure the user is authorized to perform the requested operations. Authentication may be performed in a secure entry mode. For example, a user may provide digitally signed code for execution in the secure mode. A request to execute the code, may trigger the microprocessor to switch to the secure entry mode for authentication of the digitally signed code. To perform authentication the microprocessor may have one or more public keys of authorized users stored in read only memory. The public key may be used to authenticate the digitally signed code. If the digitally signed code is authenticated by one of the public keys, the microprocessor may enter secure mode and execute the authenticated code. If the authentication fails, the processor may return to the open mode of operation.

Figure 3:
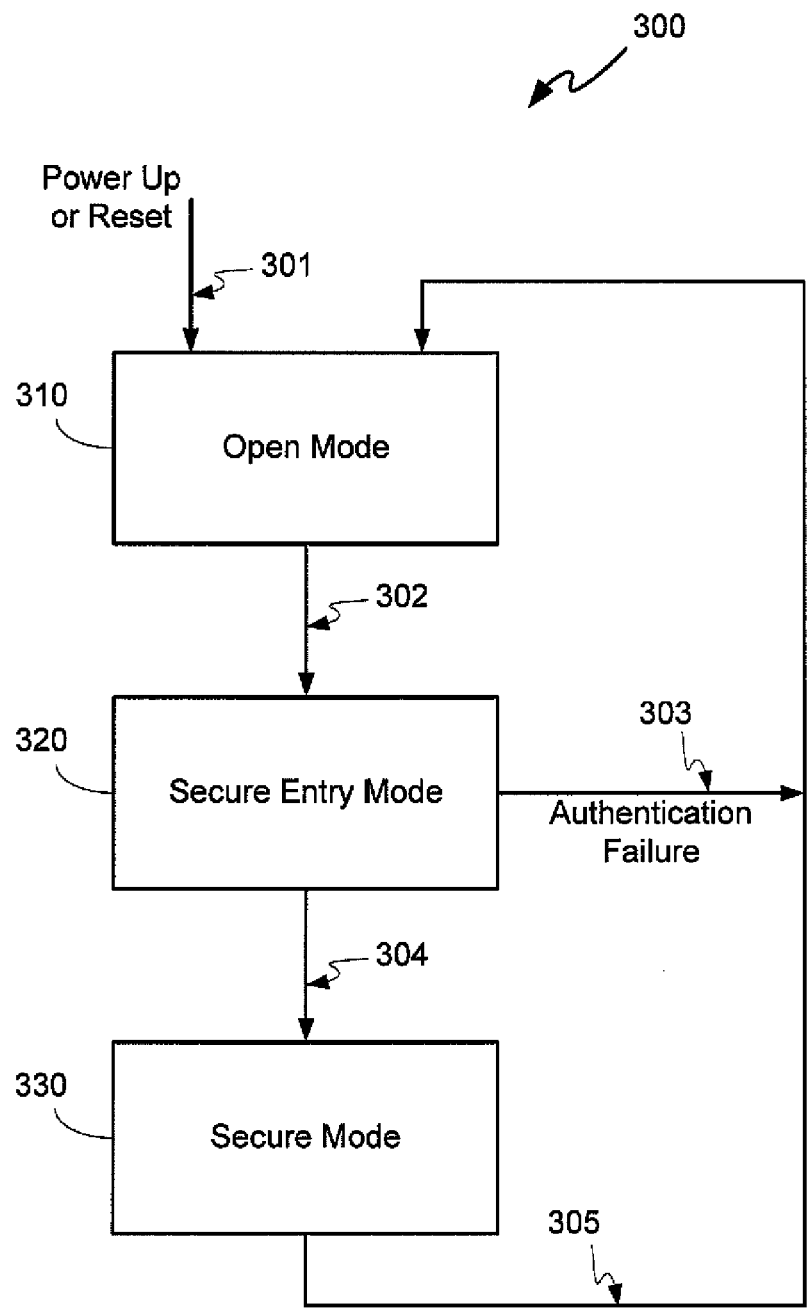
FIG. 3 is diagram of a secure state machine.

In some embodiments, the microprocessor implements a secure state machine 300 for transitioning between the open mode and the secure mode of operation. A state diagram of secure state machine 300 according to some embodiments is shown in FIG. 3. Secure state machine 300 may consist of several operating modes and transition paths between the operating modes. Each operating mode may have associated therewith different access privileges and security features, while each transition may define a relationship between the different modes.

Secure state machine 300 may be implemented in a microprocessor through registers 120, memory 130, or in any other suitable way. In the example embodiment shown in FIG. 3, secure state machine 300 may operate in an open mode 310, a secure entry mode 320, and a secure mode 330.

Open mode 310 is the default operating state of the processor in which no restrictions are present except restricted access to private memory 140. In some embodiments read and/or write access may also be prevented to certain register bits within registers 120. Open mode 310 is the default state upon power up of the microprocessor and after a reset (path 301). In some embodiments debugging capabilities (e.g., JTAG emulation) are enabled in open mode 310.

The secure state machine 300 operating in open mode 310 may transition into secure entry mode 320 (via transition 302). There is no direct path from open mode 310 into secure mode 330.

Transitioning from open mode 310 to secure entry mode 320 may be triggered, for example, by executed code, user input, or any other suitable means. In some embodiments, the transition may be triggered when microprocessor execution is directed to authentication software in public memory 150. In some embodiments, microprocessor execution may be directed to the authentication software by vectoring the program counter 122 to the first address of the authentication software. Some embodiments may require non-maskable interrupts are active. In secure entry mode 320, the authentication software may be executed by logic unit 110. The authentication software may determine if secure state machine follows transition 304 to secure mode 320 or transitions 303 back to open mode 310. In some embodiments the authentication software may include a secure entry service routine (SESR) to make this determination.

SESR may authenticate a user (e.g., verify the user is permitted access to secure mode), authenticate user code (e.g., verify code to be executed in secure mode is provided by a user permitted access to secure mode), and/or perform any other security process or combination or security processes. In some embodiments, an asymmetric cryptography process is performed. For example, digital signature authentication may be performed on a digital signature and message stored in memory 130. A public key may also be stored in memory 130 for performing this process.

In secure entry mode 320 the private memory 140 may be inaccessible. In some embodiments, the program counter 122 may be monitored to ensure that it remains within the address range allocated to the authentication software. In some embodiments, DMA access is not allowed to certain regions of memory 130, and JTAG emulation is disabled.

If the authentication fails, transition 303 from secure entry mode 320 into open mode 310 may occur. Authentication may fail, for example, if the user cannot be authenticated, the user code cannot be authenticated, the message and digital signature pair do not agree with a local public key, an error is observed, or if an interrupt must be handled.

The secure state machine 300 may only transition from secure entry mode 320 into secure mode 330 upon successful authentication. If the authentication is successful, additional steps may be performed prior to entering secure mode 330 via transition 304. In some embodiments reset diversion circuit 180 is enabled (FIG. 2). The event address 270 in the event vector table 260 may be updated. In some embodiments the event address 270 is updated to the address of the default secured system clean-up routine 160.

Secure mode 330 is a secure operating state of the microprocessor. JTAG emulation may be disabled by default upon entering secure mode. In some embodiments, authenticated code is allowed unrestricted access to the processor resources including private memory 140, public memory 150, and registers 120. In some embodiments, secure mode 330 allows access (read and/or write) to the private memory 140 where secure data such as secret keys may be stored. The private memory 140 may be used to store confidential, secret information that only authorized, authenticated user and/or code may access.

Secure state machine 300 may transition 305 from secure mode 330 back into open mode 310. In some embodiments, there may not be a direct path from secure mode 330 into secure entry mode 320. In some embodiments, transition 305 from secure mode to open mode is preceded by execution of a secured system clean-up routine. The secured system clean-up routine may be called by the authenticated code. Performing a secured system clean-up routine prior to existing secure mode may prevent sensitive code/data in memory and registers from being visible and accessible in open mode 310.

The authenticated code may contain a custom secured system clean-up routine. In some embodiments, the authenticated code updates the event register 270 in the event vector table 260 to address the location of the custom secured system clean-up routine 210 (FIG. 2). The user may rely on the custom routine instead of, for example, the default secured system clean-up routine 160.

Microprocessor 400

Figure 4:
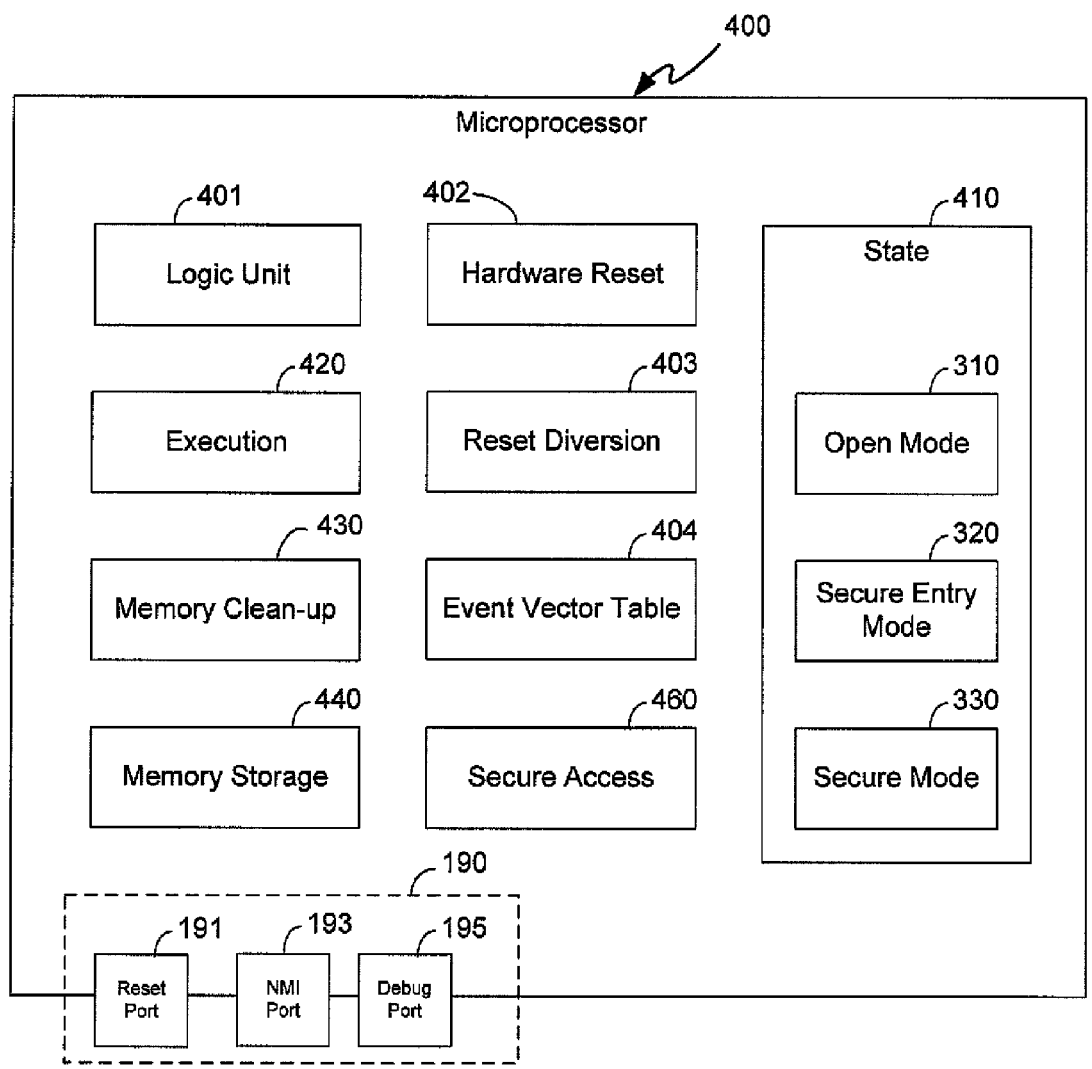
FIG. 4 is a functional block diagram of a microprocessor according to some embodiments.

FIG. 4 provides a functional block diagram of a microprocessor 400 according to some embodiments. The functional modules may be implemented in hardware, software, or any suitable combination. Microprocessor 400 has a logic module 401, hardware reset module 402, reset diversion module 403, event vector table module 404, state module 410, execution module 420, secured system clean-up module 430, memory storage module 440, secure access module 460, and I/O ports 190.

Logic module 401 is provided to execute instructions addressed by the execution module 420. Logic module and execution module 420 may be embodied as logic unit 110 and program counter 122 register, respectively (e.g., as in microprocessor 100, FIG. 1).

State module 410 may determine an operating mode and enforce rules associated with the mode. For example, reset diversion module 403 may be enabled in certain modes and disabled in others. In some embodiments, state module 410 may operate in an open mode 310, secure entry mode 320, or secure mode 330. In some embodiments, state module 410 may transition between operating states according to the operation of secure state machine 300.

Secure access module 460 may perform a security routine such as authenticating a user or code. In some embodiments, secure access module 460 provides authentication in secure entry mode 320 before state module 410 transitions to secure mode 330.

When reset diversion module 403 is disabled, reset signals received by reset port 191 may trigger hardware reset module 402 to perform a reset of microprocessor 400. When reset diversion module 403 is enabled, reset signals received by reset port 191 may trigger loading an event address from the event vector table module 404 to the execution module 420. Reset diversion module 403 may be enabled, for example, when it is determined to transition from secure entry mode 320 to secure mode 330. The secure access module 460 may enable the reset diversion module 404 upon successful authentication.

If the event address has been loaded into the execution module 420 from the event vector table module 404 (for example, as a result of a reset diversion), the logic module 401 may execute a module located by the event address. In some embodiments, the event address references a secured system clean-up module 430. Secured system clean-up module 430 may erase a portion of memory storage module 440 and any other portion of microprocessor 400 that may contain confidential information. In some embodiments, hardware reset module 402 may be triggered after completion of a routine by the secured system clean-up module 430.

Reset Protection Methods 500 & 550

A microprocessor may implement hardware reset protection while in certain states of operation (e.g., secure mode 330). The reset protection feature may prevent malicious assertions of the reset port 191 from exposing sensitive code or data present in memory 140 and/or registers 120.

Figure 5A:
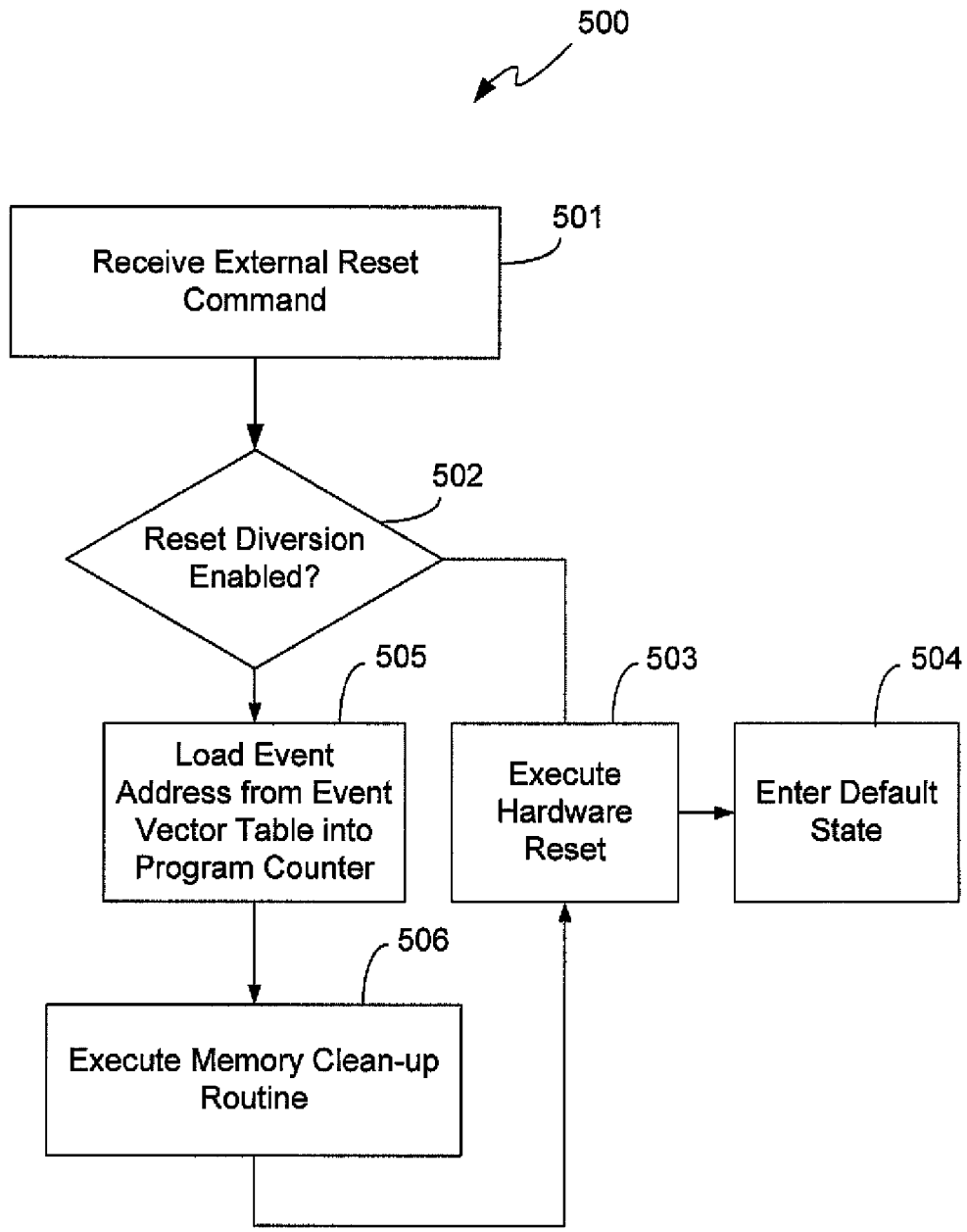
FIG. 5A is a block diagram for a method according to some embodiments.

Method 500, shown in FIG. 5A, provides a method for handling an external reset command. Method 500 may be performed, for example, by a microprocessor.

Initially, at step 501, an external reset command is received. For example, the reset command may be received by reset port 191 (FIGS. 1, 2 and 4).

At step 502, a determination is made as to whether reset diversion is enabled or disabled. If reset diversion is disabled, process flow continues to execution of a hardware reset at step 503. The hardware reset, once performed, restores the microprocessor to a default state (step 504). For example, in embodiments of the microprocessor where secure state machine 300 is implemented, open mode 310 is entered after a reset.

If at step 502, reset diversion is determined to be enabled, process flow continues to step 505. At step 505 an event address 270 may be loaded from an event vector table 260 into the program counter 122 (FIG. 2). The event address may reference a secured system clean-up routine (e.g., default secured system clean-up routine 160 or custom secured system clean-up routine 210).

At step 506, a secured system clean-up routine is executed. The secured system clean-up routine may erase confidential information from the microprocessor. The secured system clean-up routine may provide any desired functionality.

In some embodiments, secured system clean-up routine may be followed by execution of a hardware reset (step 503). The hardware reset may restore the microprocessor to a default state (step 504). In some embodiments, an explicit instruction in the secured system clean-up routine may be required to trigger execution of a hardware reset (e.g., a final instruction in the secured system clean-up routine). In some other embodiments, step 503 is performed after completion of the secured system clean-up routine without requirement of an explicit instruction in the routine. For example, a watchdog time may simply be allowed to expire, automatically triggering execution of a hardware reset.

Figure 5B:
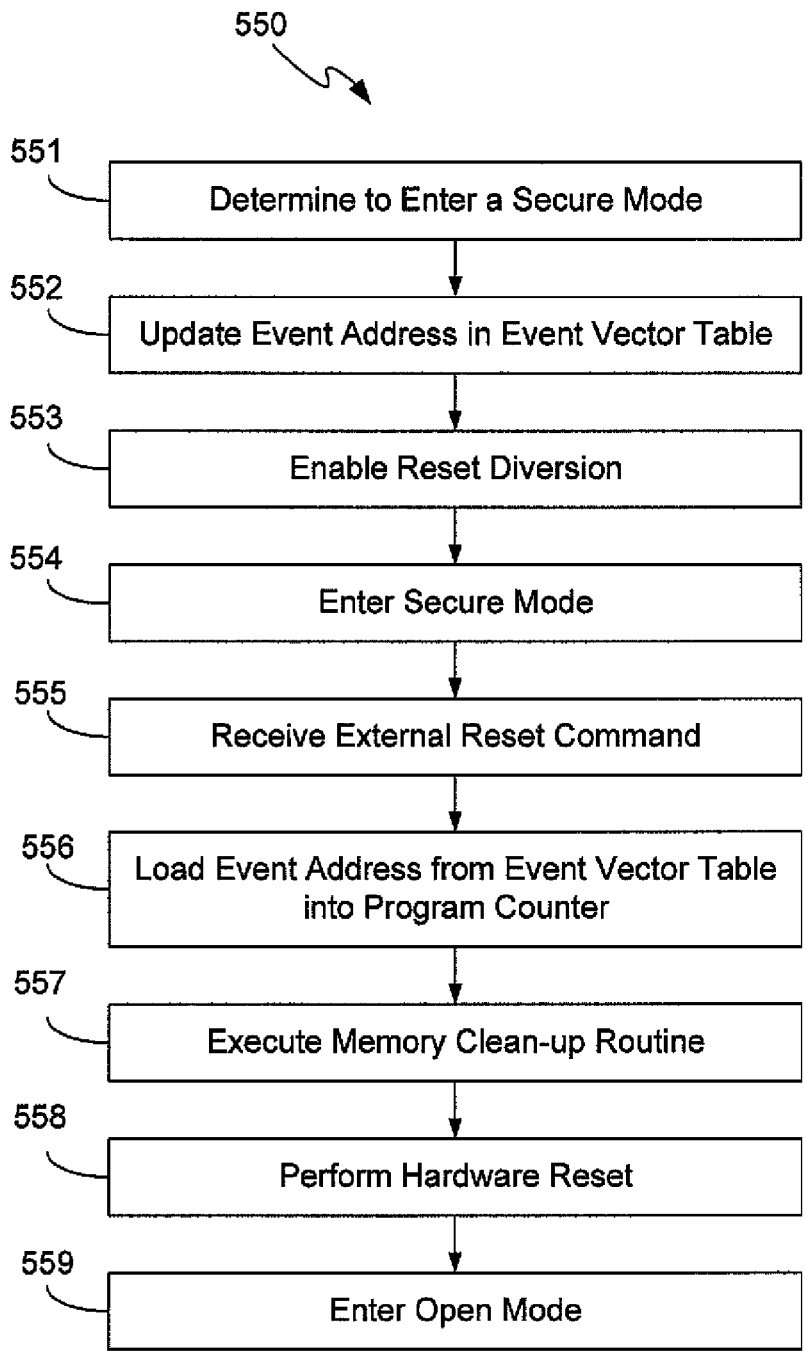
FIG. 5B is a block diagram for a method according to some embodiments.

Turn now to method 550, shown in FIG. 5B, which provides a method of operating a microprocessor.

Initially, at step 551, a determination is made to enter a secure mode of operation. The determination may be made after authenticating a user, or a code to be executed in secure mode. In some embodiments, authentication is performed by SESR. In some embodiments, a determination to enter secure mode 330 is made in a secure entry mode 320 according to secure state machine 300.

In step 552 an event address is updated in an event vector table. In some embodiments, an SESR provides an instruction to update the event vector table with an event address after successful authentication. The event address may reference a secured system clean-up routine. In some embodiments, the secured system clean-up routine may be stored in ROM.

In step 553 reset diversion is enabled. Reset diversion diverts external reset signals from triggering a hardware reset to a non-maskable interrupt. Reset diversion may be enabled by applying an input signal to a reset diversion circuit.

In step 554 a secure mode is entered. In the secure mode, private information stored in memory or registers may be accessible. For example, private memory 140 may be accessible for reading, writing, and execution by logic unit 110 (FIG. 1). The secure mode may be secure mode 330 of secure state machine 300 (FIG. 3). In some embodiments, authenticated code may be executed in the secure operating mode. In some embodiments, the authenticated code may have an instruction to update the event address in the event vector table (step 552). In some embodiments, the event address may reference a custom secured system clean-up routine. The custom secured system clean-up routine may be a portion of the authenticated code.

In step 555 an external reset command is received while in the secure mode. In some embodiments, the external reset command may be received on reset port 191. The external reset command may be received asynchronously.

In step 556, the event address is loaded from the event vector table into a program counter register. In some embodiments, the loading of the event address may be triggered by the interception of an external reset command by an enabled reset diversion circuit.

In step 557, the secured system clean-up routine is executed. In some embodiments, the secured system clean-up routine is stored at a location in a memory corresponding to the event address.

In step 558 a hardware reset is performed. In some embodiments, this may be in response to executing a software command in the secured system clean-up routine.

In step 559 the processor enters an open mode. This may be part of a boot routine triggered by the hardware reset. In some embodiments, the open mode may be open mode 310 of secure state machine 300 (FIG. 3).

Reset Diversion Circuit 180

Figure 6A:
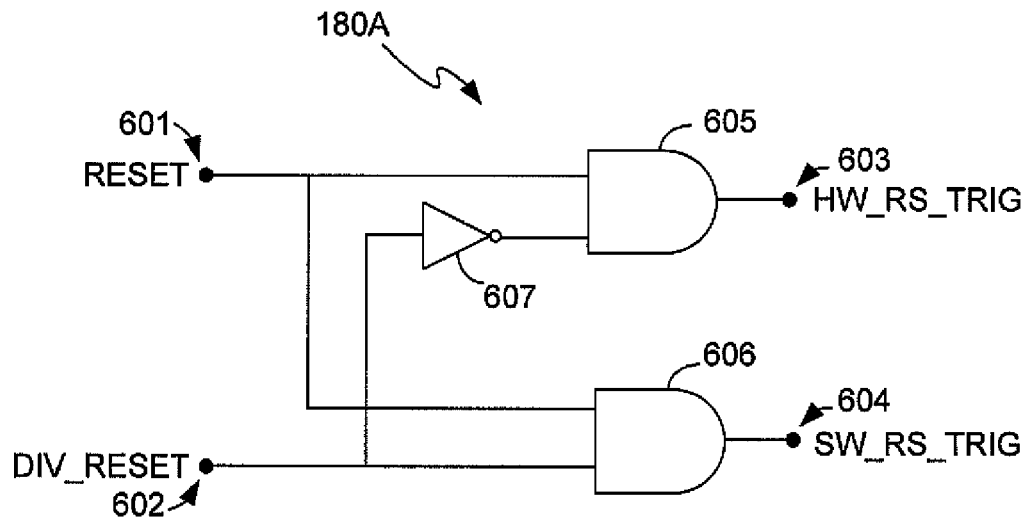
FIG. 6A is a logic diagram of a reset diversion circuit according to some embodiments.
Figure 6B:
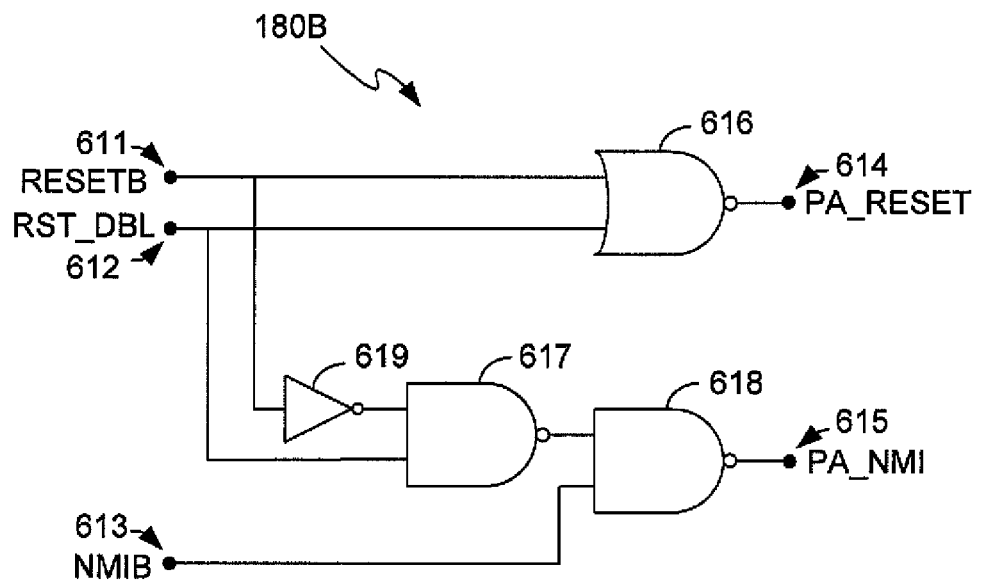
FIG. 6B is a logic diagram of a reset diversion circuit according to some embodiments.

Reset diversion circuit 180 (e.g., in FIG. 1) may be embodied in a suitable way. In some embodiments, reset diversion circuit is implemented using a logic circuit. FIGS. 6A and 6B provided example embodiments, of the reset diversion circuit 180 where logic circuits are used.

Specifically, FIG. 6A shows an embodiment, reset diversion circuit 180A, which receives input signals "RESET" and "DIV_RESET", and outputs "HW_RS_TRIG" and "SW_RS_TRIG".

RESET is a reset request signal received on input pin 601. Input pin 601, may for example, be operably coupled to the reset port 191 (FIG. 1). Asserting the reset request signal may trigger a hardware reset or software reset based on the state of DIV_RESET on input pin 602.

If a reset request signal is to be diverted to software, DIV_RESET is asserted. When DIV_RESET is asserted, the reset diversion circuit 180A is said to be enabled. When RESET and DIV_RESET are both asserted, SW_RS_TRIG is asserted on output pin 604 and a software reset may be triggered. For example, an asserted SW_RS_TRIG may result in a non-maskable interrupt. The non-maskable interrupt may trigger loading an event address for a secured system clean-up routine into a program counter register.

If DIV_RESET is unasserted, the reset signal is to be passed to the hardware reset and the reset diversion circuit 180A is said to be disabled. When RESET is asserted while DIV_RESET is unasserted, HW_RS_TRIG is asserted on output pin 603 and a hardware reset may be triggered.

This desired operation may be achieved, for example, by an implementation of the logic diagram shown in FIG. 6A having logical "AND" gates 605 and 606, and inverter 607. The logic diagram assumes all inputs and outputs are active high. The reset diversion circuit 180A may be easily modified to accommodate any signaling conditions.

Table 1 is a logic table summarizing the behavior of reset diversion circuit 180A. The symbol "0" represents an unasserted or logic low state, while the symbol "1" represents an asserted or logic high state.

TABLE 1

| INPUTS | | OUTPUTS | |
| --- | --- | --- | --- |
| RESET | DIV_RESET | HW_RS_TRIG | SW_RS_TRIG |
| 0 | 0 | 0 | 0 |
| 0 | 1 | 0 | 0 |
| 1 | 0 | 1 | 0 |
| 1 | 1 | 0 | 1 |

FIG. 6B shows an embodiment, reset diversion circuit 180B, which receives input signals "RESETB" (pin 611), "RST_DBL" (pin 612), and "NMIB" (pin 613) and outputs "PA_RESET" (pin 614) and "PA_NMI" (pin 615). Table 2 is a logic table summarizing the behavior of reset diversion circuit 180B.

The RESETB signal is an active low ("0") reset signal received on pin 611. Pin 611 may be operably connected to reset port 191 (e.g., FIG. 1). The RST_DBL signal is an active low signal indicating if the reset diversion circuit is to be disabled ("0") or enabled ("1"). The NMIB signal is an active low signal on pin 613 indicating non-maskable interrupts are enabled. PA_RESET is an active high trigger to a hardware reset. PA_NMI is active high and indicates if non-maskable interrupts are enabled. When RST_DBL is not active (i.e., "0" in Table 2), reset and NMI function normally. When RST_DBL is active, PA_RESET is not diverted.

TABLE 2

| INPUTS | | | OUTPUTS | |
| --- | --- | --- | --- | --- |
| RESETB | NMIB | RST_DBL | PA_RESET | PA_NMI |
| 0 | 0 | 0 | 1 | 1 |
| 0 | 0 | 1 | 0 | 1 |
| 0 | 1 | 0 | 1 | 0 |
| 0 | 1 | 1 | 0 | 1 |
| 1 | 0 | 0 | 0 | 1 |
| 1 | 0 | 1 | 0 | 1 |
| 1 | 1 | 0 | 0 | 0 |
| 1 | 1 | 1 | 0 | 0 |

Further Embodiments

Having thus described at least one illustrative embodiment of the invention, various alterations, modifications, and improvements will readily occur to those skilled in the art.

The microprocessor may be embodied as a system-on-a-chip, computer-on-a-chip, a microcontroller, or any suitable integrated circuit technology or combination thereof. In some embodiments, the microprocessor is an Analog Devices Blackfin Processor®.

The microprocessor may be compatible with any hardware and/or software debug tool. Debug and/or emulation commands may be received, for example, via debug port 195. The microprocessor may be compatible with the IEEE 1149.1 J-TAG standard. In some embodiments, JTAG commands are received through debug port 195.

In some embodiments, the size (e.g., number of bytes) and/or location of the private memory area may be selectable.

In some embodiments, the microprocessor may support direct memory access (DMA) to obviate the need to call the memory through the logic unit 110. In some embodiments, DMA may be selectively disabled for portions of memory 130. Which portions of memory 130 are to be DMA enabled/disabled may be controlled, for example, by one of registers 120.

Figure 7A:
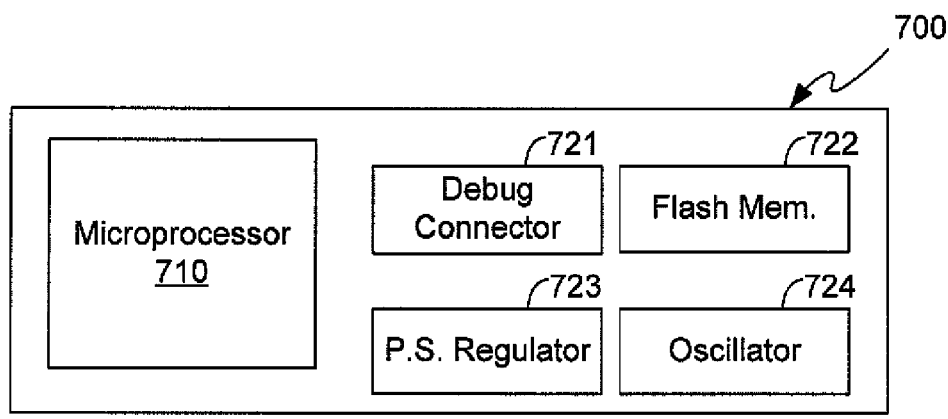
FIG. 7A is a block diagram of an embedded system according to some embodiments.

The microprocessor may be part of an embedded system 700 shown in FIG. 7A. An embedded system may consist of additional hardware operably connected to the microprocessor 710 to receive outputs and/or provide inputs to the microprocessor. Embedded system 700 is shown as a block diagram with exemplary components such as debug connection 721, flash memory 722, power supply regulator 723, and local oscillator 724. These components are purely exemplary and may or may not be present in an embodiment. Microprocessor 710 may be used in combination with any suitable components to form an embedded system 700.

Figure 7B:
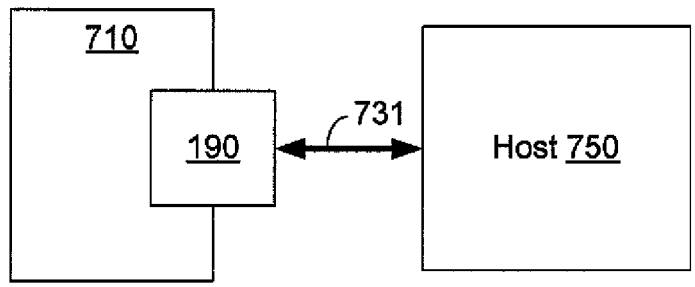
FIG. 7B is a block diagram of a host connected to a microprocessor according to some embodiments.

A connection 731 may be established for microprocessor 710 to communicate with a host 750 through one or more I/O ports 190 (e.g., reset port 191, debug port 195) as shown in FIG. 7B. Any suitable device may serve as host 700. For example, host 700 may be a personal computer, laptop computer, PDA, or flash memory device.

Figure 7C:
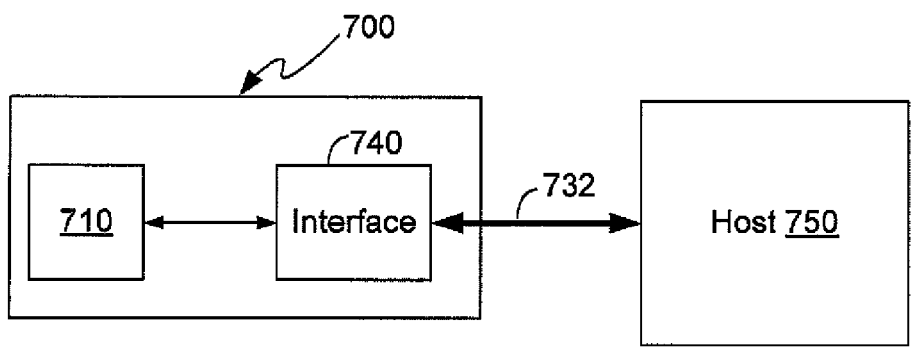
FIG. 7C is a block diagram of a host connected to an embedded system according to some embodiments.

A connection 732 may be established between embedded system 700, including microprocessor 710, and host 750 through any suitable interface 740 as shown in FIG. 7C.

Connections 731 and 732 may be implemented using any suitable technology, including and suitable wired and wireless technologies.

In some embodiments register 120 comprises a SECURE_SYSSWT register. SECURE_SYSSWT register may be a 32 bit register with memory mapped address 0xFFC04320. Table 3 provides summary of the function of each bit in the register according to some embodiments.

TABLE 3

| Bit Position | Bit Name | Bit Description |
| --- | --- | --- |
| 0 | EMUDABL | Reset = 0x0000<br>Secure Entry Mode = 0x000704d9<br>Secured Mode = 0x000704db<br>Emulation Disable<br>Upon secure entry mode EMUDABL's setting is based on the previous state of EMUOVR. Upon reentering open mode EMUDABL is cleared. This bit is always read accessible. This bit is write accessible only in secure mode.<br>0 - Private JTAG emulation instructions will be recognized and executed. Once this bit has been cleared while in secure mode it will not be set upon secure entry mode. This condition will remain until reset at which time it will be cleared. This feature may be used in security debug.<br>1 - Private JTAG emulation instructions will be ignored. Standard emulation commands such as bypass will be allowed. |
| 1 | RSTDABL | Reset Disable<br>This bit is not effected upon secure entry mode. This bit is set upon entering secure mode. Upon reentering open mode RSTDABL is cleared. This bit is always read accessible. This bit is write accessible only in secure mode.<br>0 - External resets are generated and serviced normally.<br>1 - External resets are redirected to the NMI pin. This avoids circumventing memory clean operations. |

TABLE 3-continued

| Bit Position | Bit Name | Bit Description |
|---|---|---|
| 4:2 | L1IDABL | L1 Instruction Memory Disable<br>upon secure entry mode L1IDABL is set to 0x6. Upon reentering open mode L1IDABL is cleared. These bits are always read accessible. These bits are write accessible only in secured mode. In the event DMA access is performed to a restricted memory area a DMA memory access error will occur resulting in a DMA_ERR interrupt and a clearing of DMA_RUN.<br>000 - All DMA accesses are allowed to L1 Instruction areas.<br>001 - 1 KB of memory (0xFFA00000-0xFFA003FF) has restricted non core access<br>010 - 2 KB of memory (0xFFA00000-0xFFA007FF) has restricted non core access<br>011 - 4 KB of memory (0xFFA00000-0xFFA00FFF) has restricted non core access<br>100 - 8 KB of memory (0xFFA00000-0xFFA01FFF) has restricted non core access<br>101 - 16 KB of memory (0xFFA00000-0xFFA03FFF) has restricted non core access<br>110 - 32 KB of memory (0xFFA00000-0xFFA07FFF) has restricted DMA access. This is the initial setting upon entering secure entry mode.<br>111 - Reserved |
| 7:5 | L1DADABL | L1 Data Bank A Memory Disable<br>Upon secure entry mode L1DADABL is set to 0x6. Upon reentering open mode L1DADABL is cleared. These bits are read accessible in open, secure entry, and secure mode. These bits are write accessible only in secure mode. In the event a DMA access is performed to a restricted memory area a DMA memory access error will occur resulting in a DMA_ERR interrupt and a clearing of DMA_RUN.<br>000 - All DMA accesses are allowed to L1 data bank A areas.<br>01 - 1 KB of memory (0xFF800000-0xFF8003FF) has restricted non core access<br>010 - 2 KB of memory (0xFF800000-0xFF8007FF) has restricted non core access<br>011 - 4 KB of memory (0xFF800000-0xFF800FFF) has restricted non core access<br>100 - 8 KB of memory (0xFF800000-0XFF801FFF) has restricted non core access<br>101 - 16 KB of memory (0xFF800000-0xFF803FFF) has restricted non core access<br>110 - 32 KB of memory (0xFF800000-0xFF807FFF) has restricted DMA access. This is the initial setting upon entering secure entry mode.<br>111 - Reserved |
| 10:8 | L1DBDABL | L1 Data Bank B Memory Disable<br>Upon secure entry mode L1DBDABL is set to 0x4 giving L1 Data Bank B 8 KB of non core restricted access. Upon reentering open mode L1DBDABL is cleared. These bits are read accessible in open, secure entry, and secure mode. These bits are write accessible only in secure mode. In the event a DMA access is performed to a restricted memory area a DMA memory access error will occur resulting in a DMA_ERR interrupt and a clearing of DMA_RUN.<br>000 - All DMA accesses are allowed to L1 data bank B areas. This is the initial setting upon entering secure entry mode.<br>001 - 1 KB of memory (0xFF900000-0xFF9003FF) has restricted non core access<br>010 - 2 KB of memory (0xFF900000-0xFF9007FF) has restricted non core access<br>011 - 4 KB of memory (0xFF900000-0xFF900FFF) has restricted non core access<br>100 - 8 KB of memory (0xFF900000-0xFF901FFF) has restricted non core access. This is the initial setting upon entering Secure Entry Mode.<br>101 - 16 KB of memory (0xFF900000-0xFF903FFF) has restricted on core access<br>110 - 32 KB of memory (0xFF900000-0xFF907FFF) has restricted DMA access.<br>111 - Reserved |

TABLE 3-continued

| Bit Position | Bit Name | Bit Description |
|---|---|---|
| 11 | DMA0OVR | DMA0 Memory Access Override<br>Entering secure entry mode or secure mode does not effect this bit. Upon reentering open mode DMA0OVR is cleared. This bit is read accessible in open, secure entry, and secure mode. This bit is write accessible in both secure entry mode and secure mode. Controls DMA0 access to L1 Instruction, L1 Data and L2 memory regions. When clear access restrictions are based on Memory Disable settings within this register.<br>0 - DMA0 accesses are restricted based on Memory Disable settings.<br>1 - Unrestricted DMA0 accesses are allowed to all memory areas. |
| 12 | DMA1OVR | DMA1 Memory Access Override<br>Entering secure entry mode or secure mode does not effect this bit. Upon reentering open mode DMA1OVR is cleared. This bit is read accessible in open, secure entry, and secure mode. This bit is write accessible in both secure entry mode and secure mode. Controls DMA1 access to L1 Instruction, L1 Data and L2 memory regions. When clear access restrictions are based on Memory Disable settings within this register.<br>0 - DMA1 accesses are restricted based on Memory Disable settings.<br>1 - Unrestricted DMA1 accesses are allowed to all memory areas. |
| 13 | RESERVED | Reserved bit<br>This reserved bit always returns a "0" value on a read access. Writing this bit with any value has no effect. |
| 14 | EMUOVR | Emulation Override<br>This bit is always read accessible. This bit may be written with a "1" in secured mode only. This bit can be cleared in open mode, secure entry mode and secure mode. Controls the value of EMUDABL upon secure entry mode.<br>0 - Upon secure entry mode the EMUDABL bit will be set.<br>1 - Upon secure entry mode the EMUBABL bit will be cleared. This bit can only be set when EMUDABL (bit-0) is written with a "0" while this bit (bit-14) is written simultaneously written with a "1". |
| 15 | OTPSEN | OTP Secrets Enable<br>This bit can be read in all modes but is write accessible in secure mode only.<br>0 - Read and Programming access of the private OTP area is restricted. Accesses will result in an access error (FERROR)<br>1 - Read and Programming access of the private OTP area is allowed. If the corresponding program protection bit for an access has been set, a program access will be protected regardless of this bit's setting |
| 18:16 | L2DABL | L2 Memory Disable<br>Upon secure entry mode L2DABL is set to 0x7. Upon reentering open mode L2DABL is cleared. These bits are read accessible in open, secure entry, and secure mode. These bits are write accessible only in secure mode. In the event a DMA access is performed to a restricted memory area a DMA memory access error will occur resulting in a DMA_ERR interrupt and a clearing of DMA_RUN.<br>000 - All DMA accesses are allowed to L2.<br>001 - 1 KB of memory (0xFEB00000-0xFEB003FF) has restricted non core access<br>010 - 2 KB of memory (0xFEB00000-0xFEB007FF) has restricted non core access<br>011 - 4 KB of memory (0xFEB00000-0xFEB00FFF) has restricted non core access<br>100 - 8 KB of memory (0xFEB00000-0xFEB01FFF) has restricted non core access<br>101 - 16 KB of memory (0xFEB00000-0XFEB03FFF) has restricted non core access<br>110 - 32 KB of memory (0xFEB00000-0xFEB07FFF) has restricted non core access<br>111 - 64 KB of memory (0xFEB00000-0xFEB0FFFF) has restricted DMA access. This is the initial setting upon entering secure entry mode. |

In some embodiments register 120 comprises a SECURE_CONTROL register. SECURE_CONTROL register may be a 16 bit register with memory mapped address 0xFFC04324. Table 4 provides summary of the function of each bit in the register according to some embodiments.

TABLE 4

| Bit Position | Bit Name | Bit Description |
|---|---|---|
| 0 | SECURE0 | Reset = 0x0000<br>SECURE 0<br>A write only bit. A read always returns "0." A "1" value can only be written to SECURE0 when in secure entry mode. The purpose of this control bit is to require 3 successive writes with a value of "1" to SECURE0 in order to enter secure mode.<br>0 - When written with a "0" value, all SECURE bits within this register are cleared and open mode is entered. All SYSSWT bits are cleared with the exception of EMUOVR. If EMUOVR had been set by the user, it will remain set (until RESET is asserted or until it is written with a "0").<br>1 - Initially when written with a "1" value SECURE1 will be set. With a subsequent "1" written SECURE2 will be set. A subsequent "1" written will set SECURE3. Upon a set of SECURE3 secure mode will be entered. |
| 1 | SECURE1 | SECURE 1<br>This is a read only bit and indicates a successful write of SECURE0 with a data value of "1"<br>0 - SECURE0 has not been written with a "1" value<br>1 - SECURE0 has been written with a "1" value |
| 2 | SECURE2 | SECURE 2<br>This is a read only bit and indicates two successful writes of SECURE0 with a data value of "1" has occurred<br>0 - SECURE0 has not been written with a "1" value while SECURE1 was set.<br>1 - SECURE0 has been written with a "1" value for a second time. |
| 3 | SECURE3 | SECURE 3<br>This is a read only bit and indicates three successful writes of SECURE0 with a data value of "1" has occurred.<br>0 - SECURE0 has not been written with a "1" value while SECURE2 was set<br>1 - SECURE0 has been written with a "1" value for a third time. The part is currently in secure mode and the SYSSWT register is writable by authenticated code. |

In some embodiments register 120 comprises a SECURE_STATUS register. SECURE_STATUS register may be a 16 bit register with memory mapped address 0xFFC04328. Table 5 provides summary of the function of each bit in the register according to some embodiments.

TABLE 5

| Bit Position | Bit Name | Bit Description |
|---|---|---|
| 1:0 | SECMODE | Reset = 0x0000<br>Secured Mode Control State<br>Read only bits that reflect the current mode of the secure state machine.<br>00 - Open Mode<br>01 - Secure Entry Mode<br>10 - Secure Mode<br>11 - Reserved |
| 2 | NMI | Non Maskable Interrupt<br>A read only bit that reflects the detection of NMI.<br>0 - Currently NMI is not detected.<br>1 - Currently NMI is detected. |
| 3 | AFVALID | Authentication Firmware Valid<br>A read only bit that reflects the state of the hardware monitor logic. If execution of authentication has begun properly and has had uninterrupted operation the authentication is considered valid. A valid authentication is required for secure entry mode and secure mode operation.<br>0 - Authentication has not begun properly or has been interrupted.<br>1 - Authentication is valid and is progressing properly and uninterrupted. |
| 4 | AFEXIT | Authentication Firmware Exit<br>A write one to clear status bit. In the event authentication has begun properly but has had an improper exit before completion, this bit will be set. This can only occur on an exit from secure entry mode back to open mode.<br>0 - No improper exit has been made while executing authentication firmware.<br>1 - An improper exit from authentication firmware has been made. |
| 7:5 | SECSTAT | Secure Status<br>Read/write bits to pass a status back to the handler in the event an authentication has failed. |

Alterations, modifications, and improvements that will readily occur to those skilled in the art are intended to be within the scope of the invention. Accordingly, the foregoing description is by way of example only and is not intended as limiting. The invention is limited only as defined in the following claims and the equivalents thereto.

What is claimed is:

1. A method for preventing a reset attack on a microprocessor operable in open mode and secure mode, the method comprising:
   receiving an external reset signal on a reset port of the microprocessor;
   determining the microprocessor is operating in secure mode, wherein secure mode allows authenticated code to access confidential information stored in a first storage area of the microprocessor;
   in response to determining the microprocessor is operating in secure mode, diverting, by a hardware reset diversion circuit, the external reset signal from triggering a hardware reset, to a non-maskable interrupt to trigger an execution of a secured system clean-up routine that erases any of the confidential information stored in a second storage area accessible in open mode; and
   after the secured system clean-up routine is completed or after a watchdog timer has expired, triggering the hardware reset which transitions the microprocessor from secure mode to open mode.

2. The method of claim 1, further comprising:
   when the microprocessor is operating in secure mode, storing, by the authenticated code, the confidential information in the second storage area accessible in open mode.

3. The method of claim 1, further comprising:
   determining the processor is operating in open mode; and
   in response to determining the microprocessor is operating in open mode,
   not diverting the external reset signal; and
   allowing the external reset signal to trigger the hardware reset.

4. The method of claim 1, wherein the second storage area accessible in open mode is accessible by a user through an emulation port in open mode.

5. The method of claim 1, wherein the erasing of any of the confidential information stored in the second storage area accessible in open mode comprises wiping registers used in secure mode to hold data from access reads to the first storage area.

6. The method of claim 1, wherein the confidential information comprises a secret key used by the authenticated code in secure mode.

7. The method of claim 1, wherein the secure clean-up routine executes a watchdog reset to reset the microprocessor at the completion of the secure clean-up routine.

8. The method of claim 1, wherein the non-maskable interrupt triggers the execution of the secured system clean-up routine by:
triggering a look up of an event address stored in event vector table, wherein the event address is a memory address of a location of the secured system clean-up routine; and
updating the program counter with the event address to be used by a logic unit to execute the secured system clean-up routine.

9. The method of claim 1, further comprising:
performing authentication of digitally signed code using one or more public keys of authorized users stored in read only memory of the microprocessor; and
if the digitally signed code is successfully authenticated by one of the public keys, transitioning the microprocessor into secure mode.

10. The method of claim 9, further comprising:
if the digitally signed code is successfully authenticated by one of the public keys, enabling the hardware reset diversion circuit, which, when enabled, diverts the external reset signal to execute the secured system clean-up routine, and when not enabled, does not divert the external reset signal and allows the external reset signal to trigger the hardware reset.

11. The method of claim 1, wherein:
determining the microprocessor is operating in secure mode comprises determining whether the hardware reset diversion circuit is enabled; and
the hardware reset diversion circuit, when enabled, diverts the external reset signal to execute the secured system clean-up routine, and when not enabled, does not divert the external reset signal and allows the external reset signal to trigger the hardware reset.

12. The method of claim 1, wherein the secured system clean up routine comprises an instruction which triggers the execution of the hardware reset.

13. A microprocessor operable to prevent a reset attack on the microprocessor, said microprocessor operable in open mode and secure mode, comprising:
a logic unit;
a first storage area accessible by authenticated code in secure mode and stores confidential information;
a second storage area accessible in open mode;
a hardware reset diversion circuit configured to:
receive an external reset signal on a reset port of the microprocessor;
determine the microprocessor is operating in secure mode; and
in response to determining the microprocessor is operating in secure mode, divert the external reset signal from triggering a hardware reset, to a non-maskable interrupt to trigger an execution of a secured system clean-up routine by the logic unit that erases any of the confidential information stored in a second storage area accessible in open mode; and a hardware reset module configured to, after the secured system clean-up routine is completed or after a watchdog timer has expired, execute the hardware reset which transitions the microprocessor from secure mode to open mode.

14. The microprocessor of claim 13, wherein the authenticated code, when the microprocessor is operating in secure mode, stores the confidential information in the second storage area accessible in open mode.

15. The microprocessor of claim 13, wherein the second storage area accessible in open mode is accessible by a user through an emulation port in open mode.

16. The microprocessor of claim 13, wherein the erasing of any of the confidential information stored in the second storage area accessible in open mode comprises wiping registers used in secure mode to hold data from access reads to the first storage area.

17. The microprocessor of claim 13, wherein the confidential information comprises a secret key used by the authenticated code in secure mode.

18. The microprocessor of claim 13, wherein the secure clean-up routine executes a watchdog reset to reset the microprocessor at the completion of the secure clean-up routine.

19. The microprocessor of claim 13, wherein the non-maskable interrupt triggers the execution of the secured system clean-up routine by:
triggering a look up of an event address stored in event vector table, wherein the event address is a memory address of a location of the secured system clean-up routine; and
updating the program counter with the event address to be used by the logic unit to execute the secured system clean-up routine.

20. The microprocessor of claim 13, further comprising a secure access module configured to:
perform authentication of digitally signed code using one or more public keys of authorized users stored in read only memory of the microprocessor; and
if the digitally signed code is successfully authenticated by one of the public keys, transition the microprocessor into secure mode.

21. The microprocessor of claim 13, wherein:
determining the microprocessor is operating in secure mode comprises determining whether the hardware reset diversion circuit is enabled; and
the hardware reset diversion circuit, when enabled, diverts the external reset signal to execute the secured system clean-up routine, and when not enabled, does not divert the external reset signal and allows the external reset signal to trigger the hardware reset.

22. A microprocessor operable to prevent a reset attack on the microprocessor, said microprocessor operable in open mode and secure mode, comprising:
means for receiving an external reset signal on a reset port of the microprocessor;
means for determining the microprocessor is operating in secure mode, wherein secure mode allows authenticated code to access confidential information stored in a first storage area of the microprocessor;
hardware reset diversion means for, in response to determining the microprocessor is operating in secure mode, diverting the external reset signal from triggering a hardware reset, to a non-maskable interrupt to trigger an execution of a secured system clean-up routine that erases any of the confidential information stored in a second storage area accessible in open mode; and means for, after the secured system clean-up routine is completed or after a watchdog timer has expired, triggering the hardware reset which transitions the microprocessor from secure mode to open mode.

23. The microprocessor of claim 22, wherein the hardware reset diversion means comprises:
logic circuit means for detecting if a reset request signal is asserted;
logic circuit means for detecting if a reset diversion signal is asserted; and
logic circuit means for asserting an output signal to trigger the non-maskable interrupt in response to the reset request signal and the reset diversion signal being asserted.

* * * * *